United States Patent
Nayak et al.

(10) Patent No.: US 12,342,309 B2
(45) Date of Patent: Jun. 24, 2025

(54) METHOD AND AMF APPARATUS FOR NSAC OPERATION BASED ON UE'S ACTUAL USAGE

(71) Applicant: SAMSUNG ELECTRONICS CO., LTD., Suwon-si (KR)

(72) Inventors: Ashok Kumar Nayak, Bangalore (IN); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 17/806,433

(22) Filed: Jun. 10, 2022

(65) Prior Publication Data

US 2022/0400461 A1 Dec. 15, 2022

(30) Foreign Application Priority Data

Jun. 11, 2021 (IN) .............................. 202141026148
Mar. 4, 2022 (IN) .............................. 202141026148

(51) Int. Cl.
*H04W 60/06* (2009.01)
*H04W 48/02* (2009.01)
*H04W 60/04* (2009.01)

(52) U.S. Cl.
CPC ............ *H04W 60/06* (2013.01); *H04W 48/02* (2013.01); *H04W 60/04* (2013.01)

(58) Field of Classification Search
CPC ..... H04W 60/06; H04W 48/02; H04W 60/04; H04W 48/06; H04W 76/12; H04W 60/00; H04L 45/80; H04L 47/28
See application file for complete search history.

(56) References Cited

U.S. PATENT DOCUMENTS

| | | |
|---|---|---|
| 2019/0364463 A1 | 11/2019 | Youn et al. |
| 2020/0113014 A1 | 4/2020 | Huang-Fu et al. |
| 2020/0196382 A1* | 6/2020 | Kawasaki ............... H04L 67/14 |
| 2021/0014721 A1 | 1/2021 | Youn et al. |
| 2021/0144790 A1* | 5/2021 | Faccin .................. H04W 76/18 |
| 2022/0279430 A1* | 9/2022 | Tamura ................. H04W 24/02 |
| 2022/0295380 A1* | 9/2022 | Cakulev ............ H04W 28/0925 |
| 2022/0330143 A1* | 10/2022 | Gupta ................... H04W 48/18 |

(Continued)

FOREIGN PATENT DOCUMENTS

| | | |
|---|---|---|
| WO | 2019/074347 A1 | 4/2019 |
| WO | 2020/099931 A1 | 5/2020 |

OTHER PUBLICATIONS

International Search Report dated Sep. 21, 2022 in connection with International Patent Application No. PCT/KR2022/008220, 4 pages.

(Continued)

*Primary Examiner* — Lester G Kincaid
*Assistant Examiner* — Abdullah Al Mamun

(57) ABSTRACT

The disclosure relates to a 5G or 6G communication system for supporting a higher data transmission rate. Embodiments herein provide a method of an access and mobility management function (AMF). The method includes monitoring whether a user equipment (UE) registered to a network slice establishes a protocol data unit (PDU) session using the network slice for a time, determining that the UE does not establish the PDU session in the time based on an expiration of a timer and deregistering the UE for the network slice.

12 Claims, 9 Drawing Sheets

(56) References Cited

U.S. PATENT DOCUMENTS

2022/0338062 A1\* 10/2022 Bennett ............... H04L 41/0895
2022/0345997 A1\* 10/2022 Kuge ................... H04W 60/04
2022/0394595 A1\* 12/2022 Zhu ...................... H04W 48/18
2022/0417758 A1\* 12/2022 Nooren ................. H04L 47/80

OTHER PUBLICATIONS

Written Opinion of the International Searching Authority dated Sep. 21, 2022 in connection with International Patent Application No. PCT/KR2022/008220, 3 pages.

3GPP TS 23.502 V17.0.0 (Mar. 2021); Technical Specification; 3rd Generation Partnership Project; Technical Specification Group Services and System Aspects; Procedures for the 5G System (5GS); Stage 2; (Release 17); 646 pages.

3GPP TS 23.501 V17.0.0 (Mar. 2021); Technical Specification; 3rd Generation Partnership Project; Technical Specification Group Services and System Aspects; System architecture for the 5G System (5GS); Stage 2; (Release 17); 489 pages.

Supplementary European Search Report dated Oct. 25, 2024, in connection with European Patent Application No. EP22820599.3, 12 pages.

3GPP TS 24.501 V17.2.1 (Apr. 2021) Technical Specification; 3rd Generation Partnership Project; Technical Specification Group Core Network and Terminals; Non-Access-Stratum (NAS) protocol for 5G System (5GS); Stage 3; (Release 17); 758 pages.

Apple, "Solution for Key Issue #2: Support of network slice related quota on maximum number of PDU sessions," SA WG2 Meeting #136-AH, S2-2000934 , Jan. 2020, 8 pages.

\* cited by examiner

METHOD AND AMF APPARATUS FOR NSAC OPERATION BASED ON UE'S ACTUAL USAGE

CROSS-REFERENCE TO RELATED APPLICATIONS

This application is based on and claims priority under 35 U.S.C. § 119 to Indian Patent Application No. 202141026148 filed on Jun. 11, 2021, and Indian Patent Application No. 202141026148 filed on Mar. 4, 2022, in the India Intellectual Property Office, the disclosures of which are incorporated by reference herein in their entirety.

BACKGROUND

1. Field

The present disclosure relates to a field of network slicing in a $3^{rd}$ generation partnership project (3GPP), and more particularly related to a system and a method of ensuring that a 5G system is able to efficiently enforce quota on the maximum number of terminals using a network slice defined by a single-network slice selection assistance information (S-NSSAI) based on an actual usage of user equipment (UE). This application is based on and derives the benefit of Indian Provisional Application 202141026148 filed on 11 Jun. 2021, the contents of which are incorporated herein by reference.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also fullduplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Accordingly, the embodiment herein is to provide a method of an access and mobility management function (AMF). The method includes monitoring whether a user equipment (UE) registered to a network slice establishes a protocol data unit (PDU) session using the network slice for a time, determining that the UE does not establish the PDU session in the time based on an expiration of a timer and deregistering the UE for the network slice.

In an embodiment, the deregistering of the UE includes removing the network slice from an allowed list of the UE.

In an embodiment, the deregistering of the UE further includes adding the network slice to a rejected list of the UE.

In an embodiment, the deregistering of the UE further includes transmitting, to the UE, a deregistration message including a reject cause and a retry timer.

In an embodiment, the timer includes at least one of a mobility registration update timer, a periodic registration timer or a configurable timer.

In an embodiment, further the method includes transmitting, to a network slice admission control function (NSACF) server, an update message including information on the deregistration of the UE for the network slice and receiving, from the NSACF server, a response message including information on a count of registered UEs.

In an embodiment, further the method includes receiving, from the UE, a registration request message to access at the network slice and transmitting, to the UE, a registration accept message, when a quota is available to register the UE at a NSACF server.

Accordingly, the embodiment herein is to provide an AMF. The AMF includes a communicator and at least one processor, the at least one processor is configured to monitor whether a User Equipment (UE) registered to a network slice establishes a protocol data unit (PDU) session using the network slice for a time, determine that the UE does not establish the PDU session in the time based on an expiration of a timer and deregister the UE for the network slice.

In an embodiment, at least one processor is configured to remove the network slice from an allowed list of the UE.

In an embodiment, at least one processor is configured to add the network slice to a rejected list of the UE.

In an embodiment, at least one processor is configured to transmit, to the UE, a deregistration message including a reject cause and a retry timer.

In an embodiment, the timer includes at least one of a mobility registration update timer, a periodic registration timer or a configurable timer.

In an embodiment, wherein the at least one processor is further configured to transmit, to a network slice admission control function (NSACF) server, an update message including information on the deregistration of the UE for the network slice and receive, from the NSACF server, a response message including information on a count of registered UEs.

In an embodiment, wherein the at least one processor is further configured to receive, from the UE, a registration request message to access at the network slice and transmit, to the UE, a registration accept message, when a quota is available to register the UE at a NSACF server Accordingly, the embodiment herein is to provide a method for controlling NSACF operation based on actual usage of a UE. The method includes receiving, by an Access and Mobility Management Function (AMF) apparatus, at least one registration request message, from a user equipment (UE) from a plurality of UEs, to access at least one network slice associated with an access type requiring admission control. Further, the method includes sending, by the AMF apparatus, a registration accept message to the at least one UE of the plurality of UEs when a quota is available to register the at least one UE at a NSACF server. Further, the method includes detecting, by the AMF apparatus, an inactivity of the at least one network slice associated with the access type. Further, the method includes sending, by the AMF apparatus, a number of UEs per network slice availability check and update request message to a NSACF server to decrease the count for deregistering the at least one slice for the at least one registered UE at the NSACF server that does not uses the at least one network slice associated with the access type. Further, the method includes receiving, by the AMF apparatus, a number of UEs per network slice availability check and update response message from the NSACF server confirming that a count is decreased and the network slice is available for the other UE from the plurality of UE's.

In an embodiment, further, the method includes sending, by the AMF apparatus, message indicating deregistration of the at least one slice for the at least one UE for using the at least one slice associated with the access type prior to sending the number of UEs per network slice availability check and update request message to the at the NSACF server to deregister the at least one slice for the at least one registered UE at the NSACF server that does not uses the at least one network slice, wherein the message comprises at least one of a reject cause indicating the inactivity of the at least one network slice associated with the access type and a retry timer for requesting the at least one slice again.

In an embodiment, detecting, by the AMF apparatus, the inactivity of the at least one network slice associated with the access type includes determining, by the AMF apparatus, for each registered UE, whether a timer configured for 'establishing a Protocol Data Unit (PDU) session with the AMF apparatus to use the at least one network slice associated with the access type by the at least one registered UE of the plurality of UEs' has expired and detecting, by the AMF apparatus, the inactivity of the at least one network slice in response to determining that the timer configured for establishing the PDU session is expired.

In an embodiment, detecting, by the AMF apparatus, the inactivity of the at least one network slice associated with the access type includes receiving UE usage information from at least one Network Function (NF) apparatus, and detecting the inactivity of the at least one network slice based on the received UE usage information In an embodiment, sending, by the AMF apparatus, the registration accept message to the at least one UE of the plurality of UEs includes sending, by the AMF apparatus, a number of UEs per network slice availability check and update request message to a NSACF server to check availability of a quota to register the at least one UE at the NSACF server to use the at least one network slice associated with the access type, receiving, by the AMF apparatus, a number of UEs per network slice availability check and update response message from the NSACF server confirming the quota is available and the count is increased at the NSACF server to register the at least one UE with the at least one network slice for using the at least one network slice associated with the access type, and sending, by the AMF apparatus, the registration accept message to the at least one UE of the plurality of UEs in response to receiving the number of UEs per network slice availability check and update response message from the NSACF server.

Accordingly, the embodiment herein is to provide an AMF apparatus for controlling NSACF operation based on actual usage of a UE. The AMF apparatus includes a NSACF operation controller communicatively coupled to a memory and a processor. The NSACF operation controller is configured to receive at least one registration request message, from at least one UE from a plurality of UEs, to access at least one network slice associated with an access type requiring admission control. Further, the NSACF operation controller is configured to send a registration accept message to the at least one UE of the plurality of UEs when a quota is available to register the at least one UE at a NSACF server. Further, the NSACF operation controller is configured to detect an inactivity of the at least one network slice associated with the access type. Further, the NSACF operation controller is configured to send a number of UEs per network slice availability check and update request message to the NSACF server for deregistering the at least one registered UE at the NSACF server that does not uses the at least one network slice associated with the access type and to decrease a count of registered UEs (100) at the NSACF server. Further, the NSACF operation controller is configured to receive a number of UEs per network slice availability check and update response message from the NSACF server confirming that the count is decreased and the network slice is available for the other UE from the plurality of UE's.

Accordingly, the embodiment herein is to provide a method for controlling NSACF operation based on actual usage of a UE. The method includes sending, by UE, at least one registration request message to an AMF apparatus to access the at least one network slice associated with an access type requiring admission control. Further, the method includes receiving, by the UE, a registration accept message from the AMF apparatus when a quota is available to register the at least one UE at a NSACF server. Further, the method includes receiving, by the UE, a message indicating deregistration of the slice for the UE for using the at least one slice associated with the access type. The message comprises a reject cause indicating the inactivity of the at least one network slice associated with the access type and a retry timer for requesting the at least one slice again. Further, the method includes detecting, by the UE, that the retry timer is expired and sending by the UE, at least one registration request message to the AMF apparatus to access the at least one network slice associated with an access type.

Accordingly, the embodiment herein is to provide a UE for controlling NSACF operation based on actual usage of the UE. The UE includes a NSACF operation controller communicatively coupled to a memory and a processor. The NSACF operation controller is configured to send at least one registration request message to an AMF apparatus to access the network slice associated with an access type requiring admission control. Further, the NSACF operation controller is configured to receive a registration accept message from the AMF apparatus when a quota is available to register the at least one UE at a NSACF server. Further, the NSACF operation controller is configured to receive a message indicating deregistration of the at least one slice for the UE for using the at least one slice associated with the access type. The message includes a reject cause indicating the inactivity of the at least one network slice associated with the access type and a retry timer for requesting the at least one slice again. Further, the NSACF operation controller is configured to detect that the retry timer is expired. Further, the NSACF operation controller is configured to send at least one registration request message to the AMF apparatus to access the at least one network slice associated with an access type.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments are illustrated in the accompanying drawings, throughout which like reference letters indicate corresponding parts in the various figures. The embodiments herein will be better understood from the following description with reference to the drawings, in which.

DETAILED DESCRIPTION

Figure 1:
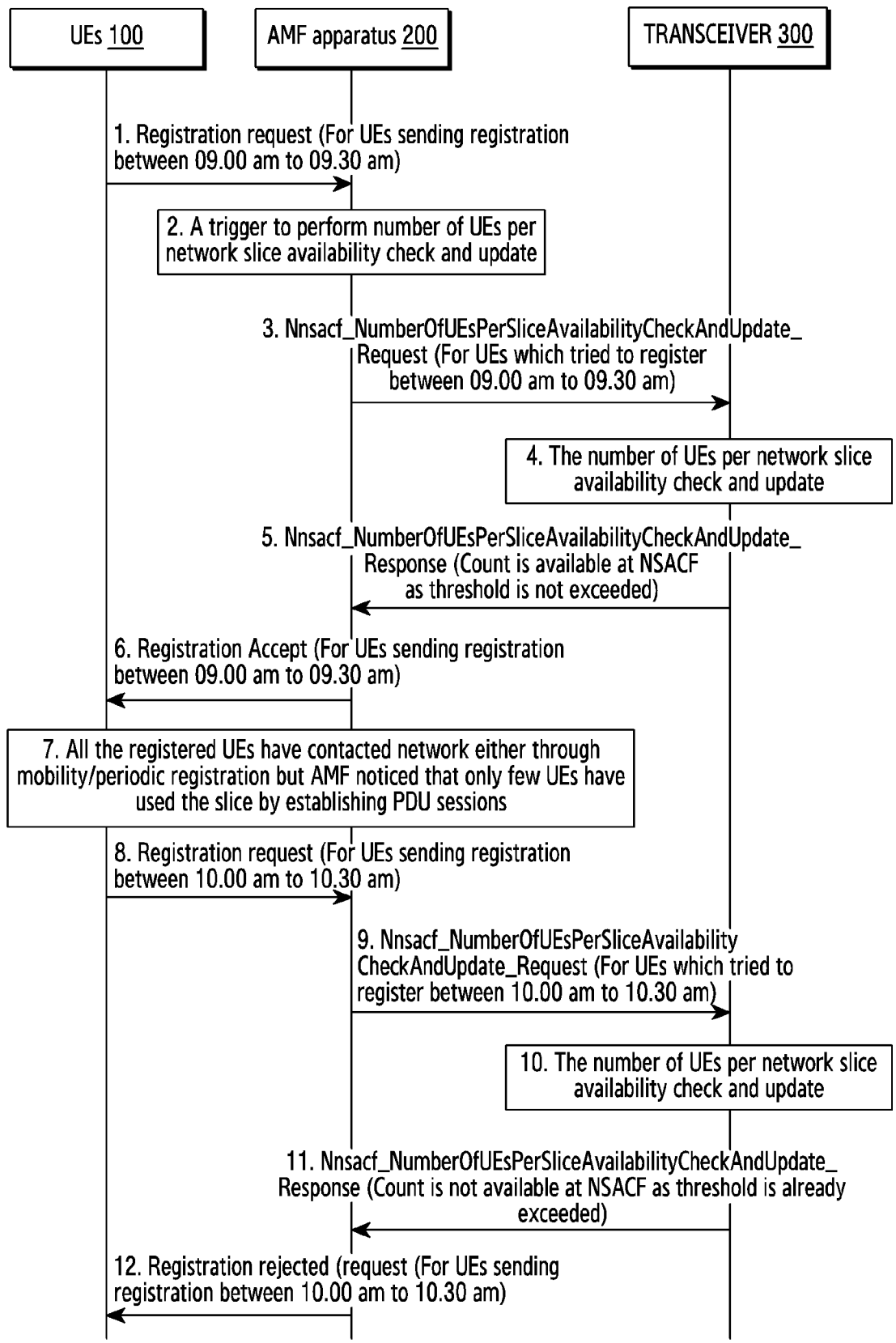
FIG. 1 illustrating a representation of a sequence of events that is expected to take place in a typical network deployment when a NSAC 3GPP Release 17 feature is deployed according to the prior art.

The 3GPP Release 15 introduced the concept of "network slicing" which allows telecom service providers deploy an exclusive network for a customer (e.g. mobile virtual network operator (MVNO), enterprise) or a service (e.g. enhanced mobile broadband (eMBB), ultra reliability and low latency communications (URLLC), massive machine-type communications (mMTC)), consisting of multiple network functions designed specifically to support the specialized service. A set of such network functions is called "network slice," identified using single network slice selection assistance information (S-NSSAI) inside a 3GPP network.

These slices are characterized by a set of both standard and proprietary attributes as defined by a "slice template." The global system for mobile communications (GSMA) defines a "generic network slice template" (GST) which provides standardized slice attributes for a set of services supported by the 3GPP. Two of the attribute defined by the GST are "number of terminals" and "number of sessions." The attribute "number of terminals" describes the maximum number of terminals (UEs) that can use the network slice simultaneously. Similarly, attribute "number of sessions" describes the maximum number of (PDU) sessions that can use the network slice simultaneously. These are important inputs in network planning, as operators need to make sure that the resources they provide for the network slice are sufficient to handle the capacity specified by these attributes.

In order to enforce these attributes, the 3GPP Rel-17 defines a functional entity "network slice admission control function (NSACF)" which monitors and controls the number of UEs/sessions registered to a network slice. The NSACF server is configured with the maximum number of the UEs per network slice and is expected to be consulted (by access and mobility management function (AMF) apparatus) while admitting the UE to the network. Similarly, the NSACF server is configured with the maximum number of sessions per network slice and is expected to be consulted (by the AMF or a SMF) while activating the PDU session. This is done for all network slices which are subject to the "quota" defined by these attributes. In 3GPP terminology, "number of terminals" may refer to "number of UEs" or "number of registrations" per access-type. Similarly, "number of sessions" may refer to "number of PDU sessions." The terms are used interchangeably throughout this document.

As specified in 3GPP TS 23.501 (Rel-17), the network slice admission control function (NSACF) server controls (i.e. increases or decreases) the current number of UEs registered for a network slice so that the NSACF server does not exceed the maximum number of UEs allowed to register with that network slice. The NSACF server also maintains a list of UE IDs registered with a network slice that is subject to admission control. When the current number of UEs registered with a network slice is to be increased, the NSACF server first checks whether the UE identity is already in the list of UEs registered with that network slice and if not, the NSACF server checks whether the maximum number of UEs per network slice for that network slice has already been reached.

The AMF apparatus triggers a request to the NSACF server for maximum number of UEs per network slice admission control when the UE's registration status for a network slice subject to the NSAC server may change, i.e. during the UE Registration procedure, the UE deregistration procedure or during network slice-specific authentication and authorisation procedures.

It may happen that some UEs after successfully registering with the network for a particular slice, the UEs do not use the slice for certain duration. But when the new UEs try to register with the network, the new UEs may get rejected because of threshold exceeded at the NSACF server. Hence it impacts the new UEs which are trying for registrations even though the registered UEs are not using the slice for any particular application and unnecessarily holding it. Thus, it is desired to address the abovementioned disadvantages or other shortcomings or at least provide a useful alternative.

The principal object of the embodiments herein is to provide a method and an AMF apparatus for controlling NSAC operation based on UE's actual usage.

Another object of the embodiments herein is to provide that the AMF apparatus can efficiently handle the NSAC by knowing the UE's usage for the registered slice, deregister the UE for the slice and hence give option to the new UEs for registering to same slice. The AMF apparatus knows the UE's usage about the slice by monitoring a PDU session after initial registration till mobility/periodic registration or operator configured timer duration. Further, AMF apparatus updates the UE after deregistering for the same slice with reject cause and provides a retry timer, upon expiry of which the AMP apparatus can register for the same slice again, so as to reduce the resource wastage.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

The advantages and features of the disclosure and the accomplishing methods thereof will become apparent from the embodiments of the disclosure described below in detail with reference to the accompanying drawings. The disclosure may, however, be embodied in many different forms and should not be construed as being limited to the embodiments of the disclosure described below; rather, these embodiments of the disclosure are provided to complete the disclosure and fully convey the scope of the disclosure to those of ordinary skill in the art and the disclosure will be defined only by the scope of the claims. Throughout the specification, like reference numerals may denote like elements.

Throughout the disclosure, the expression "at least one of a, b or c" indicates only a, only b, only c, both a and b, both a and c, both b and c, all of a, b, and c, or variations thereof.

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Examples of a terminal may include a UE, a mobile station (MS), a cellular phone, a smartphone, a computer, a multimedia system capable of performing a communication function, or the like.

In the disclosure, a controller may also be referred to as a processor.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

Also, the term "unit" used herein means a software component or a hardware component such as a field-programmable gate array (FPGA) or an application-specific integrated circuit (ASIC), and the "unit" performs some functions. However, the "~ unit" is not limited to software or hardware. The "~ unit" may be configured to be in an addressable storage medium or may be configured to operate one or more processors. Thus, as an example, the "~ unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "~ units" or may be further divided into additional components and "~ units." In addition, the components and "~ units" may be implemented to operate one or more central processing units (CPUs) in a device or a security multimedia card. Also, in embodiments, the "~ unit" may include one or more processors.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In the following description, terms and names defined in the 3rd generation partnership project long term evolution (3GPP LTE) and new radio (NR) standards or modified terms and names based thereon may be used for convenience of description. However, the disclosure is not limited to those terms and names and is equally applicable to systems according to other standards.

That is, in particularly describing the embodiments of the disclosure, the communication standards defined in 3GPP may be mainly targeted; however, the subject matter of the disclosure may also be applied to other communication systems having similar technical backgrounds with some modifications without materially departing from the scope of the disclosure, which may be possible by the judgment of those of ordinary skill in the technical field of the disclosure.

Embodiments of the present disclosure will be described below in detail with reference to the accompanying drawings.

Accordingly, the embodiment herein is to provide a method for controlling NSACF operation based on actual usage of a UE. The method includes receiving, by an AMF apparatus, at least one registration request message, from at least one UE from a plurality of UEs, to access at least one network slice associated with an access type requiring admission control. Further, the method includes sending, by the AMF apparatus, a registration accept message to the at least one UE of the plurality of UEs when a quota is available to register the at least one UE at a NSACF server. Further, the method includes detecting, by the AMF apparatus, an inactivity of the at least one network slice associated with the access type. Further, the method includes sending, by the AMF apparatus, a number of UEs per network slice availability check and update request message to a NSACF server to decrease the count for deregistering the at least one slice for the at least one registered UE at the NSACF server that does not uses the at least one network slice associated with the access type. Further, the method includes receiving, by the AMF apparatus, a number of UEs per network slice availability check and update response message from the NSACF server confirming that a count is decreased and the network slice is available for the other UE from the plurality of UE's.

In the current methods and systems, the UE sends Requested NSSAI based on the configured S-NSSAI, Allowed NSSAI and also may take the URSP rules into account while the UE does registrations with the network. The UE may register an S-NSSAI which may never be used by the UE for long time. This may impact to the other UEs which may not be able to register this slice because of NSAC procedure introduced by eNS_Ph2. As a part of NSAC procedure, there are high probabilities that the threshold would have been exceeded while these new UEs try to register and the UEs may be rejected by network.

The provided method is trying to address the above problem, by deregistering the registered UEs which has not used the slice for certain duration after successful registration for the same slice. Then allocating this quota to the new UEs which are trying to register with the network for the same slice.

In the provided method, the AMF apparatus can efficiently handle the NSAC by knowing the UE's usage for the registered slice, deregister the UE for the slice and hence give option to the new UEs for registering to same slice. The AMF apparatus knows the UE's usage about the slice by monitoring a PDU session after initial registration till mobility/periodic registration or operator configured timer duration. Further, AMF apparatus updates the UE after deregistering for the same slice with reject cause and provide a retry timer, upon expiry of which the UE can register for the same slice again, so as to reduce the resource wastage.

In an embodiment, it is provided that the AMF apparatus starts monitoring and when find out that the UE which has registered for a particular slice has not used the slice by making PDU session establishment till the periodic registration happens, the AMF apparatus may send request to the NSACF with a UE ID, that particular slice and update the flag to decrease the UE count. After successful response from NSACF the AMF apparatus proceeds with putting the slice into rejected list and update the UE with the existing procedure.

In an embodiment, the AMF apparatus starts monitoring and when find out that the UE which has registered for a particular slice has not used the slice by making PDU session establishment till the mobility registration happens, the AMF apparatus may send request to the NSACF with a UE ID, that particular slice and update the flag to decrease the UE count. After successful response from the NSACF server the AMF apparatus proceeds with putting the slice into rejected list and update the UE with the existing procedure.

In an embodiment, the AMF apparatus starts monitoring and when find out that a UE which has registered for a particular slice has not used the slice by making PDU session establishment till certain period which is configurable by operator and after expiry of this duration, the AMF apparatus may send request to NSACF with a UE ID, that particular slice and update the flag to decrease the UE count. After successful response from the NSACF the AMF apparatus proceeds with putting the slice into rejected list and update the UE with the existing procedure.

In an embodiment, it is provided that either AMF itself can start monitoring the usage of slice by the UE using PDU session establishment mentioned in all of the above embodiments or AMF can get this UE usage info from other NFs (like NWDAF or SMF etc). After knowing that the UE has not used the slice for any application it takes decision of deregistering it for the same slice.

In an embodiment, when the AMF apparatus takes decision to deregister the UE for the same slice after informing NSACF, the AMF apparatus puts the slice into the rejected list and update the UE with reject cause. the AMF apparatus can use the existing 3GPP release 17 cause or a new cause can be introduced.

In an embodiment, when the AMF deregisters the UE for that particular slice, the AMF apparatus sends a retry timer along with the rejected cause mentioned in the above embodiment.

In an embodiment, if the UE wants to use that slice for a particular application, the UE can send registration for the same slice after expiry of the retry timer given by the AMF.

Referring now to the drawings and more particularly to FIGS. 2 through 6, where similar reference characters denote corresponding features consistently throughout the figures, there are shown preferred embodiments.

FIG. 1 illustrates a representation of a sequence of events that is expected to take place in a typical network deployment when NSAC 3GPP release 17 feature is deployed.

Referring to the FIG. 1 consider a conventional methods and systems, illustrates representation of a sequence of events that is expected to take place in a typical network deployment when NSAC 3GPP Release 17 feature is deployed. For clarity call flow is mentioned between the AMF apparatus (200) and the NSACF server (300) for one UE only, this procedure may be repeated for all the UEs. Below are the flow steps:

Step #1: In a 5G network, 10 UEs (100) sent registration to a slice requiring admission control with respect to parameter "number of terminals between 09.00 am to 09.30 am time period."

Step #2: The AMF apparatus (200) initiates admission control with the NSACF server (300) for the slice that require quote enforcement as required with inputs UE-IDs and the slice along with flag to increase the count.

Step #3: The AMF apparatus (200) sends an Nnsacf_NumberOfUEsPerSliceAvailabilityCheckAndUpdate_Request (For UEs which tried to register between 09.00 am to 09.30 am) to the NSACF server (300).

Step #4: The NSACF server (300) checks the availability for the UE count and count was available to accommodate 10 UEs for the mentioned slice.

Step #5: The NSACF server (300) increased the count for all the 10 UEs and added all the UE-IDs along with the slice and then sends the successful response (e.g., Nnsacf_NumberOfUEsPerSliceAvailabilityCheckAndUpdate_Response) to the AMF apparatus (200). Please note that this procedure is explained for a single UE in call flow. For all the 10 UEs the procedures may be repeated.

Step #6: The AMF apparatus (200) sends the registration accept (for UEs sending registration between 09.00 am to 09.30 am) to the UEs (100).

Step #7: It may happen that out of 10 registered UEs, only few UEs (e.g., 3 UEs) did successful PDU session establishment by using the registered slice for some applications. Remaining UEs have done periodic registration and/or mobility registration and same slice is still registered. But they have not used the slice for any application by initiating PDU session establishment.

Step #8: The UE (100) sends the registration request message (for UEs sending registration between 10.00 am to 10.30 am) to the AMF apparatus (200).

Step #9: Few UEs (e.g., 5 UEs) tried to register for the same slice (slice for which 10 UEs have been already registered) with the network. The AMF apparatus (200) initiates the NSAC procedure by sending the request (e.g., Nnsacf_NumberOfUEsPerSliceAvailabilityCheckAndUpdate_Request) to NSACF server (300) with UE IDs and the same slice.

Step #10: the NSACF server (300) checks the availability for the UE count and count is not available to accommodate 5 UEs for the mentioned slice.

Step #11: the NSACF server (300) sends response to the AMF apparatus (200) indicating the result flag that the threshold has been exceeded.

The AMF apparatus (200) may reject the registrations for the slice which is as per existing 3GPP TS 23.502 Release 17 spec, not shown in the call flow. This procedure is explained for a single UE in call flow. For all the 5 UEs the procedures may be repeated.

Step #12: The AMF apparatus (200) sends the registration rejected message (request (For UEs sending registration between 10.00 am to 10.30 am) to the UE.

Figure 2:
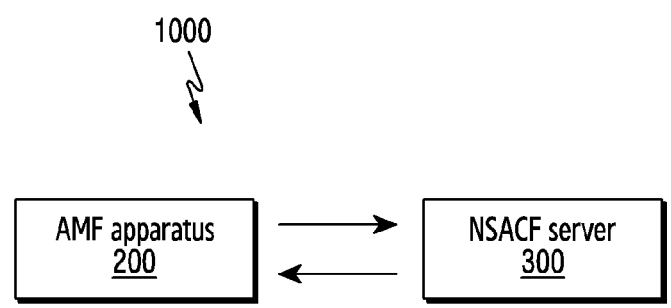
FIG. 2 illustrates an overview of a wireless network for controlling a NSACF operation based on actual usage of a UE according to an embodiment of the present disclosure.

FIG. 2 illustrates an overview of a wireless network (1000) for controlling the NSACF operation based on actual usage of the UE according to an embodiment of the present disclosure. In an embodiment, the wireless cellular network (1000) includes a UE (100) (as shown in the FIG. 5), an AMF apparatus (200) and a NSACF server (300). The wireless cellular network (1000) can be, for example, but not limited to a 5G network, a 6G network and an O-RAN network. The UE (100) can be, for example, but not limited to a laptop, a desktop computer, a notebook, a relay device, a device-to-device (D2D) device, a vehicle to everything (V2X) device, a smartphone, a tablet, an immersive device, and an internet of things (IoT) device.

The AMF apparatus (200) is configured to a registration request message, from at least one UE from a plurality of UEs (100), to access at least one network slice associated with an access type requiring admission control. Based on the registration request message, the AMF apparatus (200) is configured to send a number of UEs per network slice availability check and update request message to the NSACF server (300) to check availability of a quota to register the UE at the NSACF server (300) to use the network slice associated with the access type. Further, the AMF apparatus (200) is configured to receive a number of UEs per network slice availability check and update response message from the NSACF server (300) confirming the quota is available and the count of registered UEs (100) is increased at the NSACF server (300) to register the UE with the network slice for using the network slice associated with the access type. Further, the AMF apparatus (200) is configured to send the registration accept message to the UE of the plurality of UEs (100) in response to receiving the number of UEs per network slice availability check and update response message from the NSACF server (300).

The AMF apparatus (200) is configured to determine for each registered UE, whether a timer configured for establishing a PDU session with the AMF apparatus (200) to use the network slice associated with the access type by the registered UE of the plurality of UEs (100) has expired. In response to determining that the timer configured for establishing the PDU session is expired, the AMF apparatus (200) is configured to detect the inactivity of the network slice.

Further, the AMF apparatus (200) is configured to send a number of UEs per network slice availability check and update request message to the NSACF server (300) for deregistering the registered UE at the NSACF server (300) that does not uses the network slice associated with the access type and to decrease a count of registered UEs (100) at the NSACF server (300). Further, the AMF apparatus (200) is configured to receive a number of UEs per network slice availability check and update response message from the NSACF server (300) confirming that the count is decreased and the network slice is available for the other UE from the plurality of UE's (100).

Further, the AMF apparatus (200) is configured to send a message indicating deregistration of the slice for the UE for using the slice associated with the access type prior to sending the number of UEs per network slice availability check and update request message to the at the NSACF server (300) to deregister the slice for the registered UE at the NSACF server (300) that does not uses the network slice, where the message comprises the reject cause indicating the inactivity of the network slice associated with the access type and a retry timer for requesting the slice again.

Figure 3A:
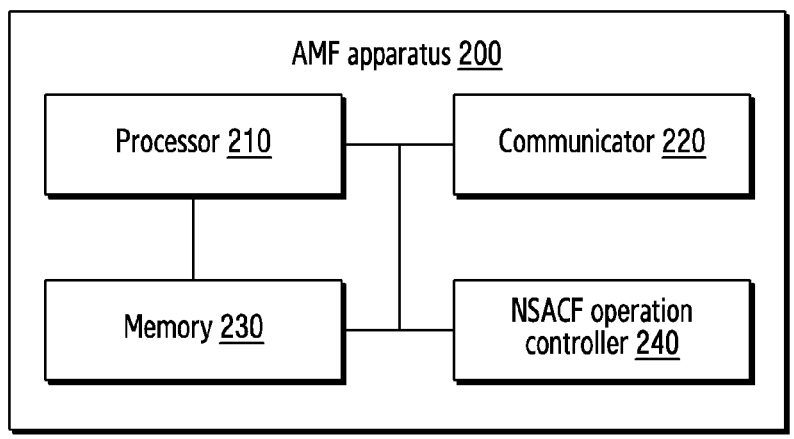
FIG. 3a illustrates various hardware components of an AMF apparatus according to an embodiment of the present disclosure.

FIG. 3a shows various hardware components of the AMF apparatus (200), according to an embodiment as disclosed herein. In an embodiment, the AMF apparatus (200) includes a processor (210), a communicator (220), a memory (230), and a NSACF operation controller (240). The processor (210) is coupled with the communicator (220), the memory (230), and the NSACF operation controller (240).

The NSACF operation controller (240) is configured to receive the registration request message to access the network slice associated with an access type requiring admission control. Based on the registration request message, the NSACF operation controller (240) is configured to send the number of UEs per network slice availability check and update request message to the NSACF server (300) to check availability of the quota to register the UE at the NSACF server (300) to use the network slice associated with the access type. Further, the NSACF operation controller (240) is configured to receive the number of UEs per network slice availability check and update response message from the NSACF server (300) confirming the quota is available and the count of registered UEs (100) is increased at the NSACF server (300) to register the UE with the network slice for using the network slice associated with the access type. Further, the NSACF operation controller (240) is configured to send the registration accept message to the UE of the plurality of UEs (100) in response to receiving the number of UEs per network slice availability check and update response message from the NSACF server (300).

The NSACF operation controller (240) is configured to determine for each registered UE, whether the timer configured for 'establishing a PDU session with the AMF apparatus (200) to use the network slice associated with the access type by the registered UE of the plurality of UEs (100) has expired. In response to determining that the timer configured for establishing the PDU session is expired, the NSACF operation controller (240) is configured to detect the inactivity of the network slice.

Further, the NSACF operation controller (240) is configured to send a number of UEs per network slice availability check and update request message to the NSACF server (300) to decrease the count for deregistering the registered UE at the NSACF server (300) that does not uses the network slice associated with the access type. Further, the NSACF operation controller (240) is configured to receive the number of UEs per network slice availability check and update response message from the NSACF server (300) confirming that the count is decreased and the network slice is available for the other UE from the plurality of UE's (100).

Further, the NSACF operation controller (240) is configured to send the message indicating deregistration of the slice for the UE for using the slice associated with the access type prior to sending the number of UEs per network slice availability check and update request message to the NSACF server (300) to deregister the slice for the registered UE at the NSACF server (300) that does not uses the at least one network slice.

The NSACF operation controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in random access memory (RAM) or cache).

Although the FIG. 3a shows various hardware components of the AMF apparatus (200) but it is to be understood that other embodiments are not limited thereon. In other embodiments, the AMF apparatus (200) may include less or more number of components. Further, the labels or names of the components are used only for illustrative purpose and does not limit the scope of the present disclosure. One or more components can be combined together to perform same or substantially similar function in the AMF apparatus (200).

Figure 3B:
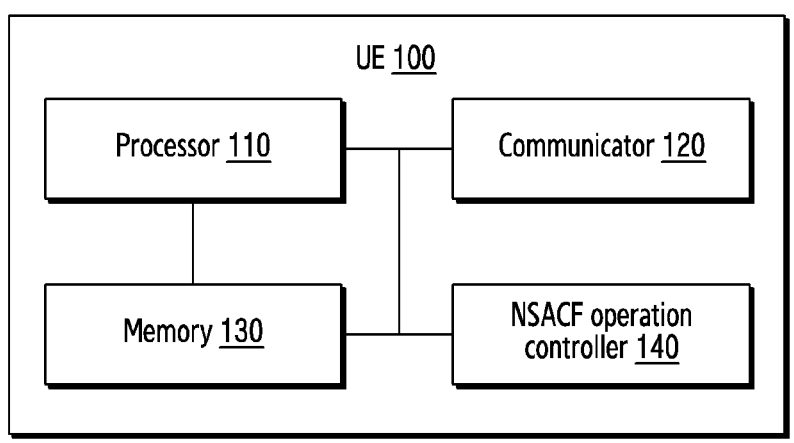
FIG. 3b shows various hardware components of the UE according to an embodiment of the present disclosure.

FIG. 3b shows various hardware components of the UE (100), according to an embodiment as disclosed herein. In an embodiment, the UE (100) includes a processor (110), a communicator (120), a memory (130), and a NSACF operation controller (140). The processor (110) is coupled with the communicator (120), the memory (130), and the NSACF operation controller (140).

The NSACF operation controller (140) is configured to send the registration request message to the AMF apparatus (200) to access the network slice associated with the access type requiring admission control. Further, the NSACF operation controller (140) is configured to receive a registration accept message from the AMF apparatus (200) when a quota is available to register the UE at the NSACF server (300). Further, the NSACF operation controller (140) is configured to receive a message indicating deregistration of the slice for the UE for using the slice associated with the access type. The message comprises at least one of a reject cause indicating the inactivity of the at least one network slice associated with the access type and a retry timer for requesting the at least one slice again. Further, the NSACF operation controller (140) is configured to detect that the retry timer is expired and send the registration request message to the AMF apparatus (200) to access the network slice associated with the access type.

The NSACF operation controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 3b shows various hardware components of the UE (100) but it is to be understood that other embodiments are not limited thereon. In other embodiments, the UE (100) may include less or more number of components. Further, the labels or names of the components are used only for illustrative purpose and does not limit the scope of the present disclosure. One or more components can be combined together to perform same or substantially similar function in the UE (100).

Figure 4A:
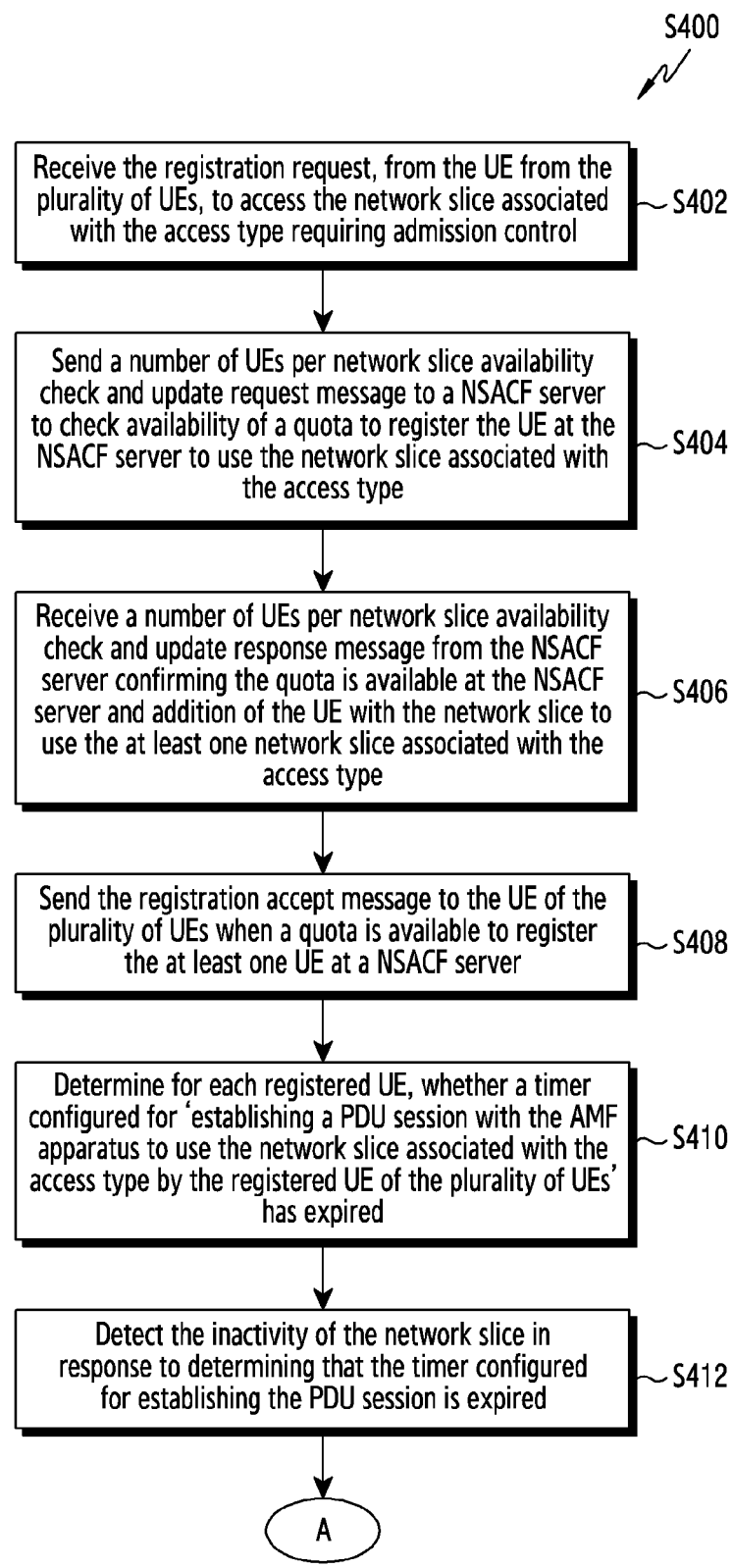
FIG. 4a and FIG. 4b illustrate flow charts illustrating a method, implemented by the AMF apparatus, for controlling the NSACF operation based on actual usage of the UE according to an embodiment of the present disclosure.
Figure 4B:
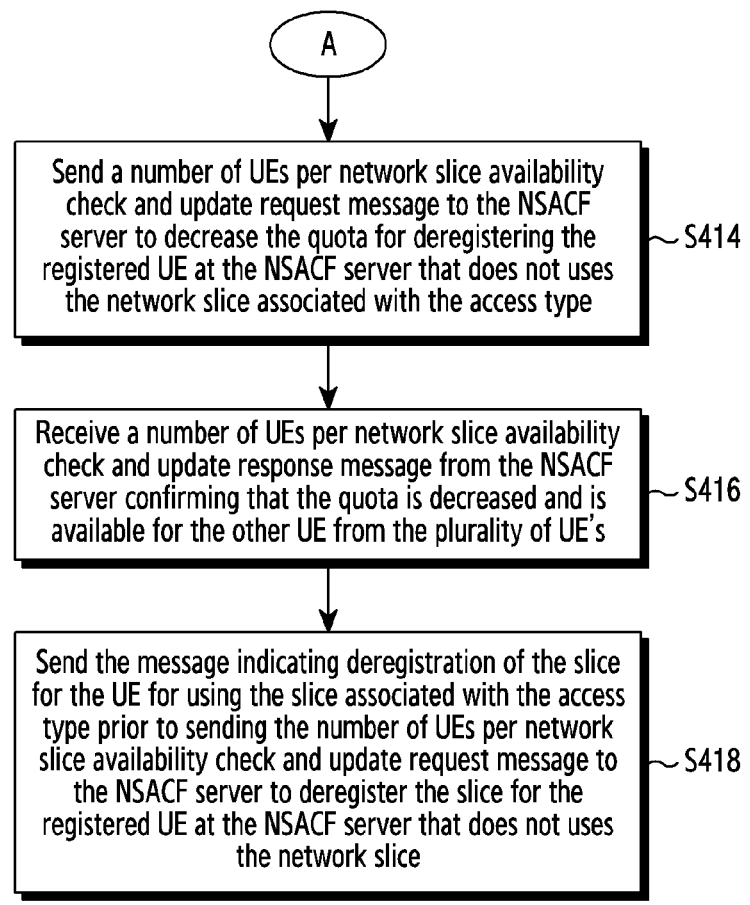

FIG. 4a and FIG. 4b illustrate flow charts (S400) for a method, implemented by the AMF apparatus (200), for controlling the NSACF operation based on the actual usage of the UE according to an embodiment of the present disclosure. The operations (S402-S418) are performed by the NSACF operation controller (240).

At S402, the method includes receiving the registration request message, from the UE from the plurality of UEs (100), to access the network slice associated with the access type requiring admission control. At S404, the method includes sending the number of UEs per network slice availability check and update request message to the NSACF server (300) to check availability of the quota to register the UE at the NSACF server (300) to use the network slice associated with the access type.

At S406, the method includes receiving the number of UEs per network slice availability check and update response message from the NSACF server (300) confirming the quota is available at the NSACF server (300) and addition of the UE with the network slice to use the network slice associated with the access type. At S408, the method includes sending the registration accept message to the UE of the plurality of UEs (100) when the quota is available to register the UE at the NSACF server (300).

At S410, the method includes determining for each registered UE, whether the timer configured for "establishing a PDU session with the AMF apparatus (200) to use the network slice associated with the access type by the registered UE of the plurality of UEs" has expired. At S412, the method includes detecting the inactivity of the network slice in response to determining that the timer configured for establishing the PDU session is expired.

At S414, the method includes sending the number of UEs per network slice availability check and update request message to the NSACF server (300) to decrease the count for deregistering the registered UE at the NSACF server (300) that does not uses the network slice associated with the access type. At S416, the method includes receiving the number of UEs per network slice availability check and update response message from the NSACF server (300) confirming that the count is decreased and the network slice is available for the other UE from the plurality of UE's (100).

At S418, the method includes sending the message indicating deregistration of the slice for the UE for using the slice associated with the access type prior to sending the number of UEs per network slice availability check and update request message to the NSACF server (300) to deregister the slice for the registered UE at the NSACF server (300) that does not uses the network slice.

Figure 5:
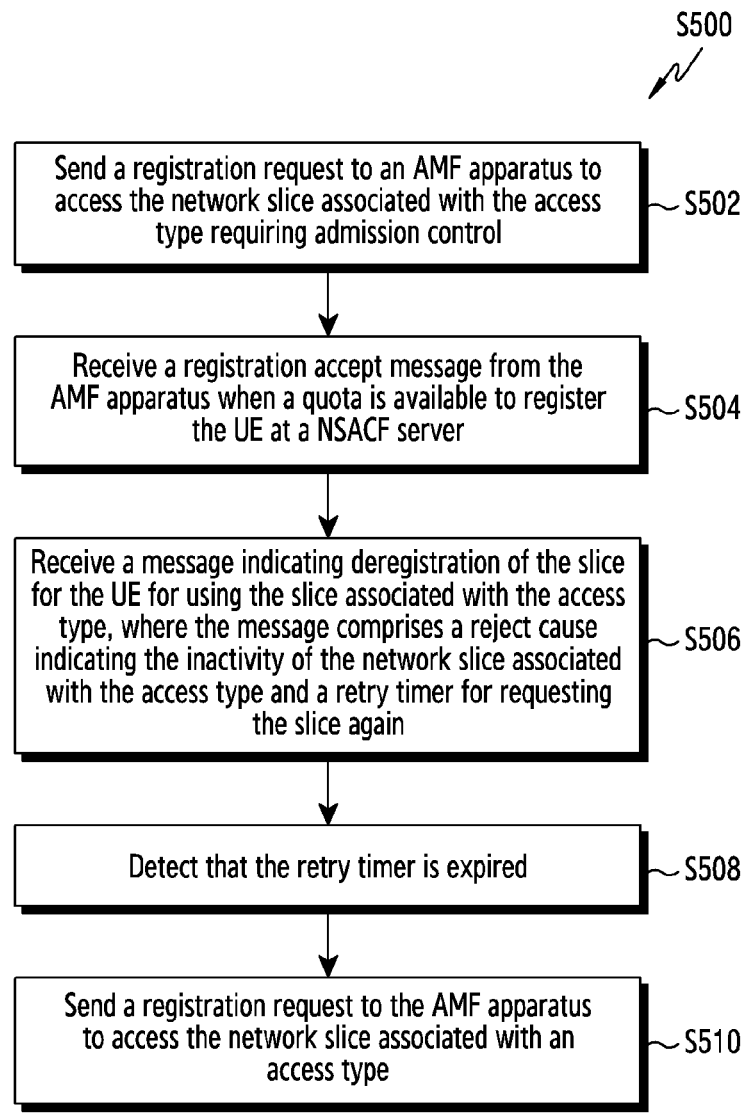
FIG. 5 illustrates a flow chart for a method, implemented by the UE, for controlling the NSACF operation based on actual usage of the UE according to an embodiment of the present disclosure.

FIG. 5 illustrates a flow chart (S500) illustrating a method, implemented by the UE (100), for controlling the NSACF operation based on actual usage of the UE according to an embodiment as disclosed herein. The operations (S502-S510) are performed by the NSACF operation controller (140).

At S502, the method includes sending the registration request message to the AMF (200) apparatus to access the network slice associated with the access type requiring admission control. At S504, the method includes receiving the registration accept message from the AMF apparatus (200) when a quota is available to register the UE at the NSACF server (300). At S506, the method includes receiving the message indicating deregistration of the slice for the UE for using the slice associated with the access type. The message includes the reject cause indicating the inactivity of the network slice associated with the access type and the retry timer for requesting the at least one slice again. At S508, the method includes detecting that the retry timer is expired. At S510, the method includes sending the registration request message to the AMF apparatus (200) to access the network slice associated with the access type.

Figure 6:
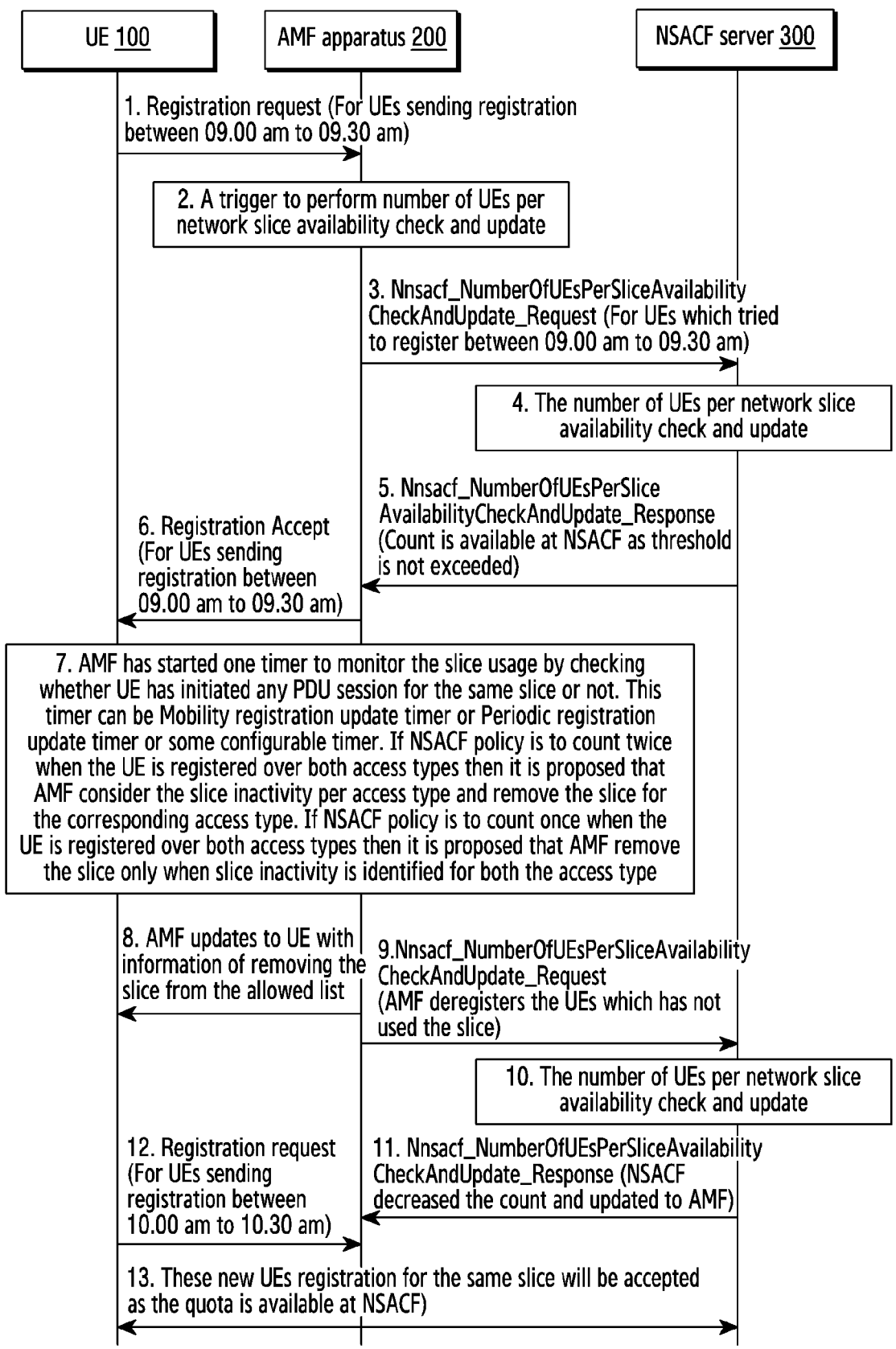
FIG. 6 illustrates a sequence diagram for a method for controlling the NSACF operation based on actual usage of the UE according to the embodiments of the present disclosure.

FIG. 6 illustrates a sequence diagram illustrating a method for controlling the NSACF operation based on actual usage of the UE according to the embodiments of the present disclosure.

Unlike to the conventional methods and systems, referring to the FIG. 6 consider a provided method, illustrates a representation of a sequence of events that is expected to take place in a typical network deployment when the NSAC 3GPP Release 17 feature is deployed. For clarity call flow is mentioned between the AMF apparatus (200) and the NSACF server (300) for one UE only, this procedure may be repeated for all the UEs. Below are the flow steps:

Step #1: In a 5G network, let us say 10 UEs sent registration to a slice requiring admission control with respect to parameter "number of terminals between 09.00 am to 09.30 am time period" to the AMF apparatus (200).

Step #2: the AMF apparatus (200) initiates admission control with the NSACF server (300) for the slice that require quote enforcement as required with inputs UE-IDs and the slice along with flag to increase the count.

Step #3, the AMF apparatus (200) sends the Nnsacf_NumberOfUEsPerSliceAvailabilityCheckAndUpdate_Request (For UEs which tried to register between 09.00 am to 09.30 am) to the NSACF server (300).

Step #4: The NSACF server (300) checks the availability for the UE count and count was available to accommodate 10 UEs for the mentioned slice.

Step #5: The NSACF server (300) increased the count for all the 10 UEs and added all the UE-IDs along with the slice and then send the successful response (i.e., Nnsacf_NumberOfUEsPerSliceAvailabilityCheckAndUpdate_Response) to the AMF apparatus (200). This procedure is explained for a single UE in call flow. For all the 10 UEs the procedures may be repeated.

Step #6, the AMF apparatus (200) sends a registration accept (for UEs sending registration between 09.00 am to 09.30 am) to the UE (100).

Step #7: The AMF apparatus (200) has started one timer to monitor the slice usage by checking whether the UE has initiated any PDU session for the same slice or not. This timer can be mobility registration update timer or periodic registration update timer or some configurable timer. If the NSACF policy is to count twice when the UE is registered over both access types then it is provided that AMF consider the slice inactivity per access type and remove the slice for the corresponding access type. If NSACF policy is to count once when the UE is registered over both access types then it is provided that the AMF apparatus (200) remove the slice only when slice inactivity is identified for both the access type Step #8, the AMF apparatus (200) updates to the UE with information of removing the slice from the allowed list.

Step #9, the AMF apparatus (200) sends the Nnsacf_NumberOfUEsPerSliceAvailabilityCheckAndUpdate_Request (AMF deregisters the UEs which has not used the slice) to the NSACF server (300).

Step #10: the NSACF server (300) decreases the count for those UEs and delete the UE-ID and slice which was NSACF had kept during initial registrations Step #11: the NSACF server (300) sends successful response to the AMF apparatus (200) as Nnsacf_NumberOfUEsPerSliceAvailabilityCheckAndUpdate_Response (the NSACF server (300) decreased the count and updated to the AMF apparatus (200)).

Step #12, the UE (100) sends the registration request message (for UEs sending registration between 10.00 am to 10.30 am) to the AMF apparatus (200).

Step #13: Now the UEs (those 5 UEs as per problem statement example) if tries to register with the network, it may be successful because threshold may not be exceeded. Counts may be available at NSACF because of step 7 where the counts has decreased some UE counts.

For clarity in the call flow only single step is shown. In real each UE may send the registration and procedures of AMF initiation towards the NSACF server (300). Also for clarity the call flow is not shown the existing steps using which the AMF apparatus (200) may put the slice into rejected list. But the new part may be the rejection cause and retry timer. Also if the UE wants after expiry of retry timer the UE can send registration with same slice. The registration flow may be repeated along with flow between the AMF apparatus (200) and the NSACF server (300).

Figure 7:
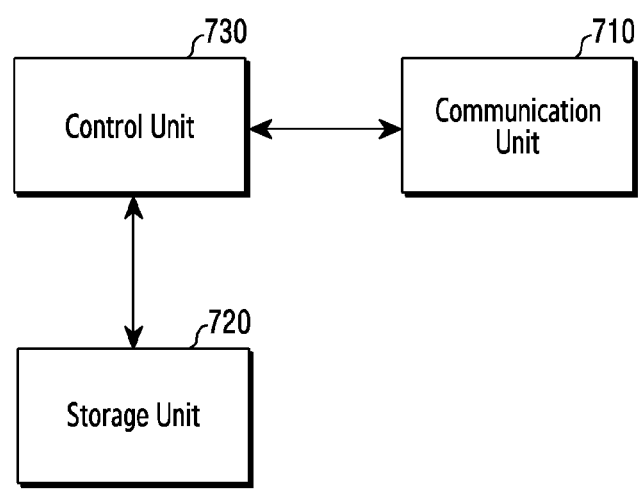
FIG. 7 illustrates a block diagram of a network entity according to the embodiments of the present invention.

FIG. 7 illustrates a block diagram of an network entity according to the embodiments of the present invention.

An embodiment of structure illustrated in FIG. 7 may be understood as a construction of a network entity. A network entity according to the embodiments of the present invention may include AMF. The terms ' . . . unit', ' . . . er', etc. used below may refer, for example, the unit of processing at least one function or operation and may include various circuitry and/or software. This may be implemented in hardware or software, or a combination of hardware and software. Further, a network entity may be referred to as a device and/or an apparatus.

Referring to FIG. 7, a network entity includes a communication unit (e.g., including communication circuitry) 710, a storage unit (e.g., including a memory) 720, and a control unit (e.g., including processing circuitry) 730.

The communication unit 710 may include various communication circuitry and presents an interface for performing communication with other entities within a network. For example, the communication unit 710 converts a bit string transmitted from the core network entity to other entities into a physical signal, and converts a physical signal received from other entities into a bit string. For example, the communication unit 710 may transmit and receive a signal. Accordingly to this, the communication unit 710 may be called a modem, a transmitter, a receiver, or a transceiver. At this time, the communication unit 710 may enable the core network entity to communicate with other entities or a system via backhaul connection (example: wired backhaul or wireless backhaul) or via a network.

The storage unit 720 may include a memory and stores data such as a basic program for an operation of the core network entity, an application program, setup information, etc. The storage unit 720 may be comprised of a volatile memory, a non-volatile memory, or a combination of the volatile memory and the non-volatile memory. And, the storage unit 720 presents the stored data in accordance with a request of the control unit 730.

The control unit 730 may include various processing circuitry and controls general operations of the core network entity. For example, the control unit 730 transmit and/or receives a signal through the communication unit 710. Also, the control unit 730 records data in the storage unit 720, and reads. For this, the control unit 730 may include at least one processor. In accordance with various embodiments, the control unit 730 may control the network entity to perform operations of various embodiments described in the present disclosure.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The methods according to the embodiments of the disclosure described in the specification or the claims may be implemented by hardware, software, or a combination thereof.

When the methods are implemented by software, a computer-readable storage medium or a computer program product may be provided to store one or more programs (software modules). The one or more programs stored in the computer-readable storage medium or the computer program product may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), non-volatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While the disclosure has been shown and described with reference to various embodiments thereof, it will be understood by those skilled in the art that various changes in form and details may be made therein without departing from the spirit and scope of the disclosure as defined by the appended claims and their equivalents.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of an access and mobility management function (AMF), the method comprising:
    monitoring whether a user equipment (UE) registered to a network slice associated with an access type establishes a protocol data unit (PDU) session using the network slice with an inactivity timer for the network slice;
    identifying that the inactivity timer expires without an establishment of the PDU session using the network slice associated with the access type; and
    removing the network slice from an allowed list associated with the access type to deregister the network slice based on expiry of the inactivity timer.

2. The method of claim 1, further comprising:
    adding the network slice to a rejected list associated with the access type,
    wherein the access type includes one of a 3rd generation partnership project (3GPP) or a Non 3GPP.

3. The method of claim 2, further comprising:
    transmitting, to the UE, a deregistration message including a reject cause and a retry timer.

4. The method of claim 1, wherein the inactivity timer is pre-configured, and
    wherein the inactivity timer comprises at least one of a mobility registration update timer, a periodic registration timer, or a configurable timer.

5. The method of claim 1, further comprising:
transmitting, to a network slice admission control function (NSACF) server, an update message including information on a deregistration of the UE for the network slice; and
receiving, from the NSACF server, a response message including information on a count of registered UEs.

6. The method of claim 1, further comprising:
receiving, from the UE, a registration request message to access at the network slice; and
transmitting, to the UE, a registration accept message when a quota is available to register the UE at a NSACF server.

7. An access and mobility management function (AMF) entity, the AMF entity comprising:
a transceiver; and
a controller coupled with the transceiver and configured to:
monitor whether a user equipment (UE) registered to a network slice associated with an access type establishes a protocol data unit (PDU) session using the network slice with an inactivity timer for the network slice;
identify that the inactivity timer expires without an establishment of the PDU session using the network slice associated with the access type; and
remove the network slice from an allowed list associated with the access type to deregister the network slice associated with the access type based on expiry of the inactivity timer.

8. The AMF entity of claim 7, wherein the controller is further configured to:
add the network slice to a rejected list associated with the access type,
wherein the access type includes one of a 3rd generation partnership project (3GPP) or a Non 3GPP.

9. The AMF entity of claim 8, wherein the controller is further configured to:
transmit, to the UE, a deregistration message including a reject cause and a retry timer.

10. The AMF entity of claim 7, wherein the inactivity timer is pre-configured, and
wherein the inactivity timer comprises at least one of a mobility registration update timer, a periodic registration timer, or a configurable timer.

11. The AMF entity of claim 7, wherein the controller is further configured to:
transmit, to a network slice admission control function (NSACF) server, an update message including information on a deregistration of the UE for the network slice; and
receive, from the NSACF server, a response message including information on a count of registered UEs.

12. The AMF entity of claim 7, wherein the controller is further configured to:
receive, from the UE, a registration request message to access at the network slice; and
transmit, to the UE, a registration accept message when a quota is available to register the UE at a NSACF server.

* * * * *